Patented Apr. 10, 1951

2,548,415

UNITED STATES PATENT OFFICE 2,548,415

BORON FLUORIDE IN ETHYLIDENE FLUORIDE FOR LOW-TEMPERATURE POLYMERIZATION

Lester Marshall Welch, Madison, and Howard L. Wilson, Elizabeth, N. J., assignors to Standard Oil Development Company, a corporation of Delaware No Drawing. Application December 8, 1948, Serial No. 64,236

3 Claims. (Cl. 260—85.3)

This invention relates to copolymers of isobutylene with a multiolefin; relates particularly to the polymerization of olefinic materials in the presence of fluorine-substituted hydrocarbons, and relates especially to the polymerization of olefins in fluorinated hydrocarbon solution by the use of Friedel-Crafts active metal halide catalysts, or complexes thereof, dissolved in fluorine-substituted hydrocarbon catalyst solvents.

It has been found possible to produce an exceedingly valuable structural material which is an elastomer, and a valuable replacement for rubber, by the copolymerization of isobutylene with a multiolefin at sharply reduced temperatures, utilizing the catalytic properties of a Friedel-Crafts active metal halide; and the process of the manufacture of these polymers is conveniently conducted as a continuous procedure by the delivery of olefins, diluent and catalyst solution to a chilled reactor in which the polymerization occurs, to produce a slurry of polymer which is discharged from the top of the reactor. Much difficulty is, however, experienced in this procedure because of the formation of rather large quantities of polymer which adhere very strongly to the inside of the reactor. Such adherent polymer layers interfere with the circulation of the polymerizate under the urge of a stirrer; and particularly interfere with the transfer of the heat of reaction to the refrigerating jacket which usually contains liquid ethylene.

This coating of polymer is termed in the plant "fouling," and the coating builds up rapidly enough to necessitate shut-down of the continuous process after from 16 hours to 50 hours of operation. In order to remove the fouling layer, it must either be scraped out by hand, which involves an exorbitant labor charge and an unduly long-time delay for warming up the reactor to room temperature, or must be dissolved off by warm naphtha at a high cost for solvent, which also involves considerable lost time.

It has been suggested that various substances could be used for diluent to reduce the fouling rate, but to the present, those substances which had a low solubility for, and in, the polymer, also had a prohibitive low solvent power for the aluminum chloride catalyst, making their use difficult and unsatisfactory. Accordingly, attempts were made to use solutions of aluminum chloride in methyl chloride as the catalyst. Such catalyst solutions applied to the mixed olefins with fluorine-substituted hydrocarbon diluents yield excellent polymers, but the problems of separating the methyl chloride from the fluorine-substituted hydrocarbon diluent were found to be very troublesome, since the usable fluorine-substituted compounds all had boiling points so close to the boiling point of methyl chloride, or formed constant boiling mixtures therewith, or showed other interfering phenomena which made it a prohibitively difficult task to separate the methyl chloride from the fluorine-substituted diluent. The cost of these materials and their poisonous character prevented disposal thereof as waste, the aluminum chloride catalyst would dissolve only in pure methyl chloride, and if the methyl chloride was not separated from the fluorine-substituted hydrocarbon, the reaction ceased to be conducted with fluorine-substituted hydrocarbons as diluent and was conducted in a mixture containing methyl chloride, in which much of the value of the fluorine compounds was lost.

This state of facts has prevented the commercial utilization of fluoro compounds for the polymerization.

According to the present invention, it is now found that a specific catalyst, that is, one containing boron trifluoride, either as such, or as a complex with various other substances, shows an excellent solubility in the fluorine-substituted compounds generally, without loss of its catalytic power. Thus, according to the invention, ethylidene fluoride and a substantial number of similar fluoro-substituted and fluoro-chloro-substituted aliphatic compounds show a good solvent power for the polymerizate mixture, thereby obtaining the benefits of polymerization in the presence of a solvent diluent; show no tendency to interfere with the polymerization reaction; show a high insolubility for the resulting polymer; and very greatly reduce the rate of reactor fouling, sufficient to lengthen the useful operating time of the reactor between necessary cleanings by from 2 to 5 times.

Thus, the process of the present invention polymerizes an olefinic material at a temperature within the range between 0° C., and —164° C., in the presence of a fluoro-substituted solvent diluent by the use of a Friedel-Crafts active metal halide catalyst in solution in a fluoro-substituted solvent, to yield a polymer slurry with a minimum of polymer material adherent to the reactor, thereby increasing the length of run in continuous equipment, or the number of batches in batch equipment, between cleanings.

Other objects and details of the invention will be apparent from the following description.

The raw materials for the present invention consist of a mono-olefin, a multiolefin, a fluoro-substituted diluent and a catalyst solution in a fluoro-substituted solvent.

For the mono-olefin, the preferred mono-olefin is isobutylene, especially if an elastomer is to be made. Alternatively, such olefins as the pentenes, both iso and normal; the hexenes, both iso and normal; the heptenes; the octenes; the nonenes; and the like through the entire range of mono-olefins, both iso and normal, up to at least 20 carbon atoms per molecule are useful. It is usually preferable that these mono-olefins be as pure as possible; with isobutylene, especially, a purity of from 98% to 99.5% being highly desirable. However, the presence of small amounts of saturates, that is, non-olefinic hydrocarbons, is immaterial, since they do not interfere with the reaction. In using isobutylene, it is usually desirable that the butene-1 and butene-2 together be kept at a value less than 2.0%, since they tend to interfere with the polymerization reaction. With the other mono-olefins, the purity requirements are much less stringent, and mixtures of the various olefins are about as satisfactory as the pure olefins and in this instance also the presence of saturated hydrocarbons is immaterial. In the practising of the present invention, the mono-olefins may be polymerized alone, to yield a homo polymer or they may be copolymerized with a wide range of other multi unsaturates, containing more than one carbon to carbon double linkage.

For the production of an elastomer, the preferred mono-olefin is isobutylene and the preferred multiolefin is generally isoprene. Nearly as good results are obtainable with such multiolefinic substances as butadiene, piperylene, cyclopentadiene, dimethyl butadiene, myrcene, and the various higher unsaturates up to at least 14 carbon atoms per molecule, including such compounds as 2-methyl, 3-nonyl, butadiene 1–3 and the like. It may be noted that the substituted butadienes generally are more or less conveniently usable without regard to the number of carbon atoms in the substituent, and without too much regard for the character of the substituents. Aliphatic radicals of any size, as far as is now known, may be present on the butadient. If a methyl group is present in the "2" position, the material copolymerizes somewhat more easily, but this is not necessary. Also, it is not necessary that the number of carbon to carbon double linkages be limited to 2, since myrcene, containing 3 is an excellent copolymerizate; nor is it necessary that the double linkages be in the condition of "conjunction," since dimethylallyl having two single linkages between the respective double linkages also is an excellent copolymerizate. Likewise, the presence of halo substituents does not prevent the polymerization reaction, although it is markedly slowed down.

Accordingly, the olefins in the polymerizate mixture may be defined as olefinic unsaturates having one or more carbon to carbon double linkage, and they are not restricted to hydrocarbons as such.

The polymerizate mixture may consist of one material only, such as isobutylene or isoprene or dimethyl butadiene or others of the materials here listed. Alternatively, very valuable results are obtainable from mixtures of unsaturates, particularly mixtures of a mono-olefin with a multiolefin. Thus, a very valuable elastomer is obtainable from mixtures of isobutylene with butadiene in which the amount of butadiene may vary from 10% to 90%; or from mixtures of isobutylene with isoprene in which the amount of isoprene may be present in from 0.5% to about 15 or 20%; or from mixtures of isobutylene with dimethyl butadiene in which the dimethyl butadiene may be present in amounts ranging from 1% to 30 or 40%. All of such mixtures produce high grade elastomers, having iodine numbers as determined by the Wijs method within the range between about 0.5 and about 150, or having molecular unsaturations ranging from 0.3% to 100%. (By molecular unsaturation is meant one residual double linkage for each molecule of monomer polymerized. That is, if the polymer material contains one molecule of isoprene and 99 molecules of isobutylene, the one residual unit of unsaturation from the isoprene molecule gives a molecular unsaturation of 1%. If there are 10 molecules, say of dimethyl butadiene and 90 molecules of isobutylene, the molecular unsaturation is 10%.)

It may be noted that the very high polymerizability and copolymerizability of isobutylene causes the isobutylene to be present in major proportion in the product obtained from almost any proportion of isobutylene and multi-olefin which can be polymerized. Even 95% butadiene with 5% of isobutylene will yield a copolymer having a molecular unsaturation less than 50%, provided the polymerization reaction is not carried too far. It may be further noted that the polymerization reaction must be discontinued at a relatively low yield to obtain the maximum properties. Alternatively, dimethyl butadiene and various other multi-unsaturates may be polymerized to homo polymers which are excellent elastomers and have molecular unsaturations of 100%. Alternatively, if a hard resin is to be produced, mixtures of multiunsaturates, or multiolefins, with other olefins then isobutylene may be used, and it is usually desirable to have the multiolefins present in at least 30% proportion.

The polymerization reaction is preferably conducted at a reduced temperature. For the making of an elastomer, especially with isobutylene in the polymerizate mixture, the temperature range preferably is from −40 to −164° C.; the preferred temperature range being from about −78° C., as set by solid carbon dioxide to about −103° C., as set by liquid ethylene. For the production of other polymers, the temperature range preferably is from about +15° C. to about −50° C., the preferred range being from about +15° C. to about −25° C. According to the present invention, the reduced temperature is obtained by a refrigerating jacket upon the reactor, containing an appropriate refrigerant under pressure or suction according to the relationship between the desired temperature and atmospheric pressure boiling point.

According to the present invention, the polymerizate mixture also contains a fluoro-substituted hydrocarbon diluent, ethylidene difluoride, having the formula $CH_3CHF_2$, being the preferred diluent. However, a considerable number of other fluoro-substituted hydrocarbons may also be used as diluents.

Particularly useful and representative of the useful list, are such substances as difluoro butane, difluoro propane, ethylidene chloro fluoride, dichloro tetrafluoro ethane, monochlor difluoro methane, and the like. The essence of the invention involves the utilization of a fluorine-substituted compound, which is mixable in substantial proportion with isobutylene and the multi-unsaturates; has a very low solubility for and in olefinic polymers of molecular weights above 20,000; together with a catalyst solution in a fluoro-substituted compound, having similar characteristics, which may be the same, or a different compound.

Within the scope of the invention, it is desirable that the fluoro-substituted diluent be present in amounts ranging from one-quarter volume to ten volumes per volume of olefinic material, the preferred amount being from one and one-half volumes to three volumes.

This mixture of unsaturates and fluoro-substituted diluent at the desired temperature within the indicated range is then polymerized by the application of a dissolved Friedel-Crafts active metal halide catalyst. It may be noted that boron fluoride is particularly convenient for this use, in view of its relatively high solubility in the fluoro-substituted compound, and accordingly, the catalyst may be a solution of boron fluoride in the same fluoro-substituted compound, thereby simplifying the recovery of diluent after the polymerization reaction, since there is but a single non-olefinic material to be separated. It may be noted that aluminum chloride as such, is only very slightly soluble in the fluoro compounds and the maximum solubility is too low to cause polymerization of isobutylene or other olefins and multiolefins. Moreover, such compounds as titanium tetrachloride, the various uranium chlorides as such, and the like also show unsatisfactory solubility and are entirely not suitable as catalysts. However, certain complex catalysts such as the complexes of $AlCl_3$ and $BF_3$ with B,B', dichloroethyl ether are good catalysts when dissolved in $CH_3CHF_2$, but the $BF_3$ complex is preferred.

The catalyst may be applied in a variety of ways such as by application to the surface of the rapidly stirred olefin-halogenated diluent mixture; or as a fine, high pressure jet into the body of rapidly stirred polymerizate mixture, or in the form of a spray through a spray nozzle onto the surface of the agitated liquid.

The reaction proceeds promptly to the production of the desired polymer or copolymer, which, depending upon the polymerizate mixture, the catalyst and the reaction temperature, may have a molecular weight within the range between 4,000 or 5,000 and 500,000. If a substantial molecular unsaturation is obtained, and the polymer has a molecular weight above 20,000 to 25,000, and an iodine number above about 0.5, the material is curable with sulfur to yield an excellent replacement for natural rubber (caoutchouc). This material, combined with sulfur or a quinone dioxime compound, or a dinitroso compound, will show tensile strengths within the range between 750 pounds and 4500 pounds per square inch, and an elongation at break between 250% and 1200%.

In addition, the cured material is either wholly saturated chemically by the curing reaction, or substantially saturated chemically so that there is no active residual unsaturation, as is the case with natural rubber and the various Bunas, to permit of an oxidation aging reaction, leading to loss of elasticity and of tensile strength.

The resulting polymer is also equivalent to, if not superior to the analogous polymers of the prior art, showing possibly higher molecular weight under analogous polymerization conditions. Also, the low solubility of the polymer in the diluent greatly reduces the tendency toward precipitation of polymer on the cold reactor walls. This reduced fouling tendency is of the utmost commercial importance, in view of the saving in "turn-around time" and in cleaning time in the reactor. That is, the present commercial reactors will function smoothly for from 16 to 50 hours, after which they must be cleaned. If they are to be scraped by hand, as sometimes happens, the refrigerating jacket must be drained and refilled with hot gas from the compressor to bring the reactor temperature up to room temperature, since otherwise, workmen cannot enter the reactors. In the commercial 10-foot diameter x 29-foot high reactor, the warming up requires from 3 to 8 or 10 hours; the scraping will take from 12 to 24 hours and recooling from 3 to 6 or 8 hours, depending upon available compressor capacity. Thus, the cleaning time may amount to a very substantial fraction of the "on stream time"; or may even exceed the "on stream time." Cleaning by the use of light naphtha solvent is somewhat shorter in time and saves the labor charge but substitutes for the labor charge the cost of a large amount of solvent. It may be noted that the commercial reactor becomes inoperable when there is approximately ¼ ton of polymer adherent on the inner surface. However, a solution of polymer in naphtha containing 10% of polymer is the maximum concentration which will flow through pipes, and accordingly, to dissolve ¼ ton of polymer there must be used 2½ tons of solvent as a minimum and it usually runs double that. It will accordingly be observed that any procedure which increases the length of successive runs is very important commercially and a gain in length of run produced by the present procedure of from 2 to 5 times, markedly reduces the cost of producing copolymer.

EXAMPLE 1

A series of feed mixtures were prepared for comparison. The unsaturates consisted of approximately 97 parts of isobutylene of about 99.5% purity, with 3 parts of isoprene of about 96% purity. Five portions of this feed mixture were then prepared and diluted, two with approximately 3 volumes of methyl chloride, and the other three with approximately 3 volumes of ethylidene fluoride. The resulting respective portions were successively polymerized in a jacketed reactor in which the jacket contained liquid ethylene, yielding a temperature in the polymerizate mixture of approximately −98° C. Simultaneously, catalyst solutions were prepared, one consisting of approximately 0.17 gram of boron fluoride per 100 cc. of ethylidene fluoride, another consisting of 0.56 gram of $BF_3$ per 100 cc. of ethylidene fluoride, and the other consisting of 0.16 gram of $AlCl_3$ per 100 cc. of methyl chloride. The methyl chloride solution was used with the methyl chloride diluent and the ethylidene fluoride solution was used with both methyl chloride and ethylidene fluoride diluted reactants as shown.

The percent conversion, the molecular unsaturation, the Staudinger molecular weight number were then determined as shown in the following Table I.

Portions of the respective polymers were then compounded according to the following recipe:

| | Parts |
|---|---|
| Polymer | 100 |
| Zinc oxide | 5 |
| Sulfur | 2 |
| Carbon black | 50 |
| Tuads [1] | 1 |
| Captax | 0.5 |

[1] (Tuads) is tetramethyl thiuram disulphide. These compounded (Captax) is 2 mercaptobenzothiazole.

Samples were then cured for 8 minutes at 320° F., and test specimens were cut from the cured samples. Tensile strengths, elongations at break and moduli were determined on the test samples as shown in the last 4 columns of Table Ia.

liquid isoprene of 99% purity, the mixture consisting of 97 parts by volume of isobutylene and 3 parts by volume of isoprene. Each polymerization then was conducted in the presence of 3 volumes of the respective diluents as shown in

*Table I*

PREPARATION OF DIOLEFIN-OLEFIN COPOLYMERS WITH BORON TRIFLUORIDE IN ETHYLIDENE FLUORIDE [1]

| Run No. | Composition of Feed, cc. | | | | | Catalyst Solution | | |
|---|---|---|---|---|---|---|---|---|
| | Methyl Chloride | Ethylidene Fluoride | Isobutylene | Isoprene | Butadiene | Catalyst | Solvent | Conc. Cat., g./100 cc. |
| 1 | 1,050 | none | 350 | [2] 10.1 | none | AlCl$_3$ | MeCl | 0.16 |
| 2 | 1,050 | none | 350 | 10.1 | none | BF$_3$ | Ethylidene Fluoride | 0.17 |
| 3 | none | 1,050 | 350 | 10.1 | none | BF$_3$ | do | 0.17 |
| 4 | none | 1,050 | 350 | 10.1 | none | BF$_3$ | do | 0.56 |
| 5 | none | 1,050 | 350 | none | 328 | BF$_3$ | do | 0.17 |

*Table Ia*

| Run No. | Per Cent Conv. [3] | Mole Per Cent Unsat. I$_2$-HgOAc | Mol Wt. Staud. | 8' Cures @ 320° F.[4] | | | |
|---|---|---|---|---|---|---|---|
| | | | | Tensile | Ultimate Elongation | Modulus | |
| | | | | | | 300% | 400% |
| 1 | 61 | 1.1 | 48,200 | 2,030 | 780 | 330 | 580 |
| 2 | 90 | 0.75 | 71,600 | 1,700 | 840 | 100 | 240 |
| 3 | 81 | 1.28 | 64,800 | 2,530 | 780 | 440 | 730 |
| 4 | 37 | | 57,000 | 1,980 | 740 | 450 | 660 |
| 5 | 27 | 1.82 | 92,000 | 2,760 | 680 | 700 | 1,240 |

[1] Polymerizations were conducted in a 2.5 liter batch reactor with external liquid ethylene refrigeration. Polymerization temperatures varied from −103° C. to −91° C.
[2] 3 parts by weight based on 100 parts of isobutylene.
[3] Based on the isobutylene.
[4] Curing recipe: Polymer, 100; Gastex, 50; Zinc oxide, 5; Sulfur, 2; Tuads, 1; Captax, 0.5.

Table I shows the details of five polymerizations under varying conditions; the first polymerization being a standard of reference according to the prior art, the remaining four utilizing ethylidene fluoride as the diluent.

Table Ia shows the percent conversion, the percent of molecular unsaturation, the Staudinger molecular weight number and the tensile strength, the elongation at break and modulus of cured samples. It will be noted that the properties of the polymers according to the present invention are distinctly superior to those of the polymers made according to the prior art, in that the ultimate tensile strengths run definitely higher, the elongation at break is about the same and the modulus considerably higher, all of which are advantageous properties of the polymer according to the present invention.

In addition, it was found that the reactor was much cleaner after the ethylidene fluoride polymerizations than after the ethyl chloride polymerizations.

EXAMPLE 2

In view of the excellent quality of polymer and the very excellent cleanliness of the reactor, another series of polymerizations were conducted in a pilot plant batch reactor equipped with a removable sleeve suitable for quantitative determinations on the amount of reactor fouling. This reactor consisted of the usual type of cylindrical container, jacketed with liquid ethylene, equipped with a powerful stirrer and provided with supplies of mixed olefins and catalyst.

A series of four polymerizations were conducted as shown in Table II. In conducting these polymerizations, there was prepared a mixture of liquid isobutylene of 99% purity and a mixture of the table. The first column shows the run number, the second column shows the character of diluent, the third column shows the catalyst efficiency, measured in terms of grams of polymer per gram of catalyst, the fourth column shows the percent conversion on the amount of mixed unsaturates in the reactor, the fifth column shows the molecular percent of unsaturation as measured by the iodine chloride method, the sixth column shows the Staudinger molecular weight number of the polymer obtained, and the seventh column shows the degree of fouling of the inside of the reactor. The amount of fouling was determined by the steps of conducting the polymerization in the normal manner by adding the catalyst, which in runs 6 and 7 was the solution of aluminum chloride in methyl chloride containing approximately 0.2 gram of aluminum chloride per 100 cc. of methyl chloride; and in runs 8 and 9 consisted of approximately 0.25 gram of boron trifluoride per 100 cc. of ethylidene fluoride.

When sufficient catalyst had been added to polymerize from half to three-quarters of the total unsaturates, the delivery of catalyst was terminated. When the reaction was complete, the slurry in the reactor was diluted with additional diluent and small amounts of water to halt the reaction. The removable sleeve was then lifted out from the reactor away from the diluted slurry, warmed up and dried. The film formed on the inside surface of the sleeve was then stripped off, weighed and the number of milligrams per 15 square inches determined.

It will be noted that the two runs with methyl chloride showed from 39 to 68 milligrams of adherent polymer, whereas the similar runs with ethylidene fluoride showed about 4 milligrams, Also, the polymer slurry was superior in physical character with the ethylidene fluoride diluent.

Table II
EFFECT OF ETHYLIDENE FLUORIDE ON REACTOR FOULING[1]

| Run No. | Diluent[2] | Catalyst Efficiency | Per Cent Conv. | Mole Per Cent Unsat. ICl | Mol. Wt., Staud. | Film Fouling[3] Mg./15 sq. in. |
|---|---|---|---|---|---|---|
| 6 | MeCl | 915 | 75 | 1.27 | 43,000 | 68 |
| 7 | do | 540 | 70 | 2.16 | 47,000 | 39 |

Milky slurry—medium polymer deposit at gas-liquid interface. Small mass fouling deposits.

| Run No. | Diluent[2] | Catalyst Efficiency | Per Cent Conv. | Mole Per Cent Unsat. ICl | Mol. Wt., Staud. | Film Fouling[3] Mg./15 sq. in. |
|---|---|---|---|---|---|---|
| 8 | Ethylidene fluoride. | 950 | 52 | 2.16 | 61,000 | 4 |
| 9 | do | 780 | 77 | 2.18 | 57,000 | 4 |

Very fine particle size slurry. No gas-liquid interface deposit. No mass fouling.

[1] Polymerizations were conducted in a 2.5 liter, ethylene-jacketed, baffled batch reactor.
[2] A B-3-99 (100 parts isobutylene+3 parts of 99% pure isoprene) feed was diluted with 3 volumes of respective diluent.
[3] Film was obtained on the upper one-half of the baffled sleeve.

The polymers obtained were cured according to a standard recipe with appropriate amounts of carbon black; separate samples were then cured at 307° F., for 20, 40 and 60 minutes, whereafter tensile strength determinations, elongation at break and moduli determinations were made, as shown in Table IIa.

Table IIa
EVALUATION OF POLYMERS

| Run No. | Diluent | Mooney Viscosity 1½-8 | Parts Cabot #9[1] | Cures at 307° F. | | | | | | | | |
|---|---|---|---|---|---|---|---|---|---|---|---|---|
| | | | | Tensile | | | Elongation | | | 400% Moduli | | |
| | | | | 20' | 40' | 60' | 20' | 40' | 60' | 20' | 40' | 60' |
| 6 | MeCl | 62-57 | 10 | 3,600 | 3,130 | 2,480 | 940 | 770 | 680 | 650 | 1,130 | 1,270 |
| 7 | | | 50 | 2,900 | 3,030 | 2,920 | 860 | 710 | 660 | | | |
| 8 | Ethylidene Fluoride | 79-78 | 10 | 3,970 | 3,610 | 3,040 | 930 | 800 | 750 | 610 | 950 | 1,240 |
| 9 | | | 50 | 3,070 | 3,050 | 3,060 | 860 | 760 | 690 | | | |

[1] Recipe: Polymer, 100; Cabot #9, as shown; Zinc oxide, 5; Stearic acid, 3; Sulfur, 2; Tuads, 1; Captax, 0.5.

These results show the superior quality of polymer obtainable and the much lower rate of deposition of adherent polymer. The increase in run length is not necessarily in proportion to the reduction in fouling rate, but it is of the same order of magnitude, and the results in this example show the very greatly reduced rate of deposition of surface fouling.

EXAMPLE 3

In view of the very great reduction in fouling rate shown in the first nine runs, another series of runs were made utilizing a pilot plant continuous type reactor in which similar polymerizate mixtures and catalyst were used. It may be noted that in the plant the condition of the reactor is determined by temperature measurements of the reactor contents, and the temperature of the refrigerating jacket. It will be noted that there is a definite temperature gradient through the walls of the reactor between the liquid ethylene refrigerant and the reactor contents. This temperature gradient increases quite rapidly with increase in thickness of fouling layer. Accordingly, the change in temperature between the refrigerant and the reactant media with time, $$\frac{d\Delta T}{dt}$$

is a good index of the rate of reactor fouling since the increase in $\Delta T$ is the result of polymer film deposit on the reactor wall. Accordingly, temperature readings were made at regular intervals to ascertain the $\Delta T$ value.

Table III
A. EFFECT OF ETHYLIDENE FLUORIDE ON CONTINUOUS REACTOR FOULING[1]

| Run No. | Diluent[2] | Catalyst Efficiency, g.pol./g. cat. | Slurry Conc., g./100 cc. | Length of Run, Hrs. | Reason for Termination | $\frac{d\Delta T}{dt}$ | Reactor Fouling, Grams | | | | |
|---|---|---|---|---|---|---|---|---|---|---|---|
| | | | | | | | Head | Nozzles | Draft Tube | Wall | Impeller and Shaft |
| 10 | MeCl | 246 | 11-13 | 4.0 | High Temp. | 2.25 | 5.6 | 5.7 | 21.3 | 6.0 | 25.1 |
| 11 | Ethylidene Fluoride | 365 | 10-15 | 8.0 | do | 1.25 | 4.1 | 4.5 | 39.5 | 8.8 | 2.4 |

[1] Polymerizations were carried out in the annex 3.5 liter continuous reactor. Catalyst was added at the top of the draft tube and the feed was added in the annulus.
[2] The B-2.5 feed was diluted with two volumes of the respective diluent.

Table IIIa

B. EVALUATION OF POLYMERS

| Run No. | Diluent | Approx. Per Cent Conv. | Mole Per Cent Unsat. I₂-Hg (OAc)2 | Mol. Wt., Staud. | Mooney Viscosity, 1½-8' | Tube Stock Cures at 320° F.[3] | | | | | |
|---|---|---|---|---|---|---|---|---|---|---|---|
| | | | | | | Tensiles | | Elongation | | 300% Moduli | |
| | | | | | | 8' | 16' | 8' | 16' | 8' | 16' |
| 10 | MeCl | 60 | 1.38 | 38,700 | 53-48 | 1,940 | 1,950 | 760 | 700 | 560 | 710 |
| | do | 67 | 1.29 | 35,800 | 48-41 | 1,990 | 1,640 | 780 | 630 | 430 | 640 |
| 11 | Ethylidene Fluoride | 75 | 1.09 | 50,400 | 66-63 | 2,300 | 2,420 | 760 | 660 | 460 | 740 |
| | do | 70 | 1.46 | 48,600 | 63-60 | 2,190 | 2,030 | 780 | 690 | 420 | 630 |

[3] Recipe: Polymer, 100; Gastex, 50; Zinc oxide, 5; Sulfur, 2; Tuads, 1; Captax, 0.5.

In this run a similar olefinic polymerizate feed was used except that it contained 2.5% isoprene.

In the respective polymerizations when methyl chloride was used as a diluent, a solution of aluminum chloride in methyl chloride, approximately 0.2 gram per 100 cc. was used, whereas when ethylidene fluoride was used as diluent the catalyst was a solution of boron trifluoride in ethylidene fluoride, approximately 0.25 gram per 100 cc. It will be noted that with methyl chloride, a run length of only 4 hours was obtained, at the end of which time the temperature gradient had reached the point where the reactor was inoperable, whereas with ethylidene fluoride, after 8 hours run the reactor was still operating satisfactorily.

At the end of the respective runs, the reactor was drained, brought up to room temperature, the adherent polymer stripped from the various polymerization structures and weighed. It will be noted that ethylidene fluoride diluent produces substantially less fouling upon critical operating polymerization structures than does methyl chloride diluent. It may be noted that with the ethylidene fluoride the impeller stirrer and shaft showed a negligible amount of fouling and the reactor head and nozzles showed markedly less fouling, whereas the draft tube upon which fouling is much less troublesome showed considerably more.

The respective polymers from the 2 runs were then compounded in duplicate according to the recipe shown, after determination of the molecular unsaturation, molecular weight number and the Mooney viscosity, curing being conducted for 8 and 16 minutes at 320° F. It will be noted from Table IIIa that substantially superior polymers are obtained as well as markedly increased run length. These results again show the substantial superiority of ethylidene fluoride over prior catalyst diluent combinations.

It appears that the reduction in reactor fouling is due in part to reduced solubility of the polymer in ethylidene fluoride as compared to methyl chloride. To check this point a series of determinations of the solubility of the copolymer in ethylidene fluoride and in methyl chloride at −100° C., were made. The results are shown in Table IV.

Table IV

| Temperature, °C. | Solvent or Reactant Diluent | Solubility of Polymer g.polymer/100 cc. Solvent |
|---|---|---|
| −100 | Ethylidene fluoride | 0.0014 |
| | | 0.0005 |
| −100 | Methyl chloride | 0.015 |
| −100 | Ethyl chloride | 0.127 |

These data show that butyl polymer is only 1/10 as soluble in ethylidene fluoride as it is in methyl chloride at low temperatures. This decrease of solubility of polymer in ethylidene fluoride causes the polymer to be less solvated and the particles of slurry are less tacky. As a result of this improved granular nature of the particles, the adherence of the polymer particles to the reactor wall or to other deposited polymer is diminished to a considerable degree. This explanation is reasonable in view of the fact that ethyl chloride as a reactant diluent causes poor slurries and heavy reactor fouling. The above data show that butyl polymers are about nine times more soluble in ethyl chloride than in methyl chloride.

EXAMPLE 4

A similar series of runs were made using dichloro tetrafluoro ethane, and nearly identical results were obtained, showing a similar increase in polymer quality and a similar very great improvement in reactor cleanliness.

EXAMPLE 5

Still another series of runs were made using monochloro difluoro methane, and again excellent results were obtained, nearly as good as those with ethylidene fluoride.

EXAMPLE 6

Still another series of runs were made with difluoro dichloro methane, and again excellent results were obtained, although not quite as good as with ethylidene fluoride.

EXAMPLE 7

A similar series of polymerizations were conducted using trifluoro propane as diluent, and catalyst solvent; and again excellent results were obtained.

EXAMPLE 8

Another similar series of polymerizations were conducted using difluoro dichloro ethane, and in this instance also, similarly excellent results were obtained.

EXAMPLE 9

A mixture was prepared consisting of approximately 50 parts of styrene with 50 parts of isobutylene together with 3 volumes of ethylidene fluoride per volume of mixed styrene-isobutylene. This mixture was polymerized by the application of a catalyst consisting of approximately 1 gram of boron trifluoride in solution per 100 cc. of ethylene fluoride. Polymer was formed with an IV of 0.72 at 81% conversion. A similar run at 22% conversion resulted in a polymer of .91IV.

In all of the polymerizations, the reactor was found to be substantially free from adherent polymer, with an extremely small amount of fouling occurring, usually from ½ to ⅕ of the amount of fouling observed in the ordinary polymerizations using methyl chloride or similar diluent.

Thus, the invention consists in the process of polymerizing ethylenic unsaturates in the presence of a fluoro-substituted diluent and catalyst solvent with which the unsaturates are mixable, but in which the polymer produced is substantially insoluble, whereby fouling of the reactor walls is avoided or minimized; utilizing a fluoro-substituted diluent which is liquid at the polymerization temperature, non-reactive with the Friedel-Crafts catalyst, dissolves at least 0.1% of at least one Friedel-Crafts catalyst, and a solubility for olefinic polymer at —100° C., of no more than 0.005%.

While there are above disclosed but a limited number of embodiments of the process and product of the present invention, it is possible to produce other embodiments without departing from the inventive concept herein disclosed, and it is therefore desired that only such limitations be imposed on appended claims as are stated therein or required by the prior art.

What is claimed is:

1. In a continuous polymerization process for the preparation of a copolymer, the steps comprising continuously delivering to a polymerization reactor a stream consisting of a major proportion of isobutylene and a minor proportion of isoprene; diluting the mixture with from ½ volume to 10 volumes of ethylidene difluoride; copolymerizing the mixture of isobutylene and isoprene by the continuous addition to the reaction mixture of a liquid stream of previously prepared polymerization catalyst consisting of boron trifluoride in solution in ethylidene difluoride, maintaining the temperature within the range between —40° C. and —103° C. throughout the entire copolymerization reaction, whereby there is obtained a solid copolymer which is insoluble in the ethylidene difluoride and which is characterized by having a Staudinger molecular weight number above about 20,000 and whereby the adhesion of solid copolymer particles to the polymerization reactor walls is minimized by the presence of the ethylidene difluoride.

2. In a continuous polymerization process for the preparation of the copolymer, the steps comprising continuously delivering to a polymerization reactor a mixture consisting of about 97 wt. percent of isobutylene and about 3 wt. percent of isoprene; diluting the mixture with about 3 volumes of ethylidene difluoride; copolymerizing the mixture of isobutylene and isoprene by the continuous addition thereto of a liquid stream of previously prepared polymerization catalyst consisting of about 0.1 to about 0.6 gram of boron trifluoride per 100 cc. of ethylidene difluoride as catalyst solvent, maintaining a temperature of approximately —98° C. throughout the entire copolymerization reaction, whereby there is obtained a solid copolymer which is insoluble in the ethylidene difluoride and which is characterized by having a Staudinger molecular weight number above about 48,000 and whereby the adhesion of solid polymer particles to the polymerization reactor walls is minimized by the presence of the ethylidene difluoride.

3. In a continuous polymerization process for the preparation of a copolymer, the steps comprising continuously delivering to a polymerization reactor a stream consisting of a major proportion of isobutylene and a minor proportion of a diolefin having from 4 to 14, inclusive, carbon atoms per molecule; diluting the mixture with from ½ volume to 10 volumes of ethylidene difluoride; copolymerizing the mixture of isobutylene and diolefine by the continuous addition to the reaction mixture of a liquid stream of previously prepared polymerization catalyst consisting of boron trifluoride in solution in ethylidene difluoride, maintaining the temperature within the range between —40° C. and —103° C. throughout the entire copolymerization reaction, whereby there is obtained a solid copolymer which is insoluble in the ethylidene difluoride and which is characterized by having a Staudinger molecular weight number above about 20,000 and whereby the adhesion of solid copolymer particles to the polymerization reactor walls is minimized by the presence of the ethylidene difluoride.

LESTER MARSHALL WELCH.
HOWARD L. WILSON.

REFERENCES CITED

The following references are of record in the file of this patent:

UNITED STATES PATENTS

| Number | Name | Date |
|---|---|---|
| 2,243,470 | Morway | May 27, 1941 |
| 2,356,128 | Thomas | Aug. 22, 1944 |
| 2,494,585 | Saylor | Jan. 17, 1950 |